(No Model.)

S. T. STITES.
TIRE SHRINKER.

No. 531,981. Patented Jan. 1, 1895.

Witnesses:
Geo. S. Briggs
C. Behel

Inventor:
Samuel T. Stites
By A. O. Behel
Atty.

THE NORRIS PETERS CO., PHOTO-LITHO., WASHINGTON, D. C.

UNITED STATES PATENT OFFICE.

SAMUEL T. STITES, OF ROCKFORD, ILLINOIS.

TIRE-SHRINKER.

SPECIFICATION forming part of Letters Patent No. 531,981, dated January 1, 1895.

Application filed August 14, 1894. Serial No. 520,332. (No model.)

*To all whom it may concern:*

Be it known that I, SAMUEL T. STITES, a citizen of the United States, residing at Rockford, in the county of Winnebago and State of Illinois, have invented certain new and useful Improvements in Tire-Shrinkers, of which the following is a specification.

The object of this invention is to apply a device to a well known tire shrinker, preventing the tire from breaking during the shrinking process, and made adjustable to accomodate different thicknesses of tires.

Figure 1:
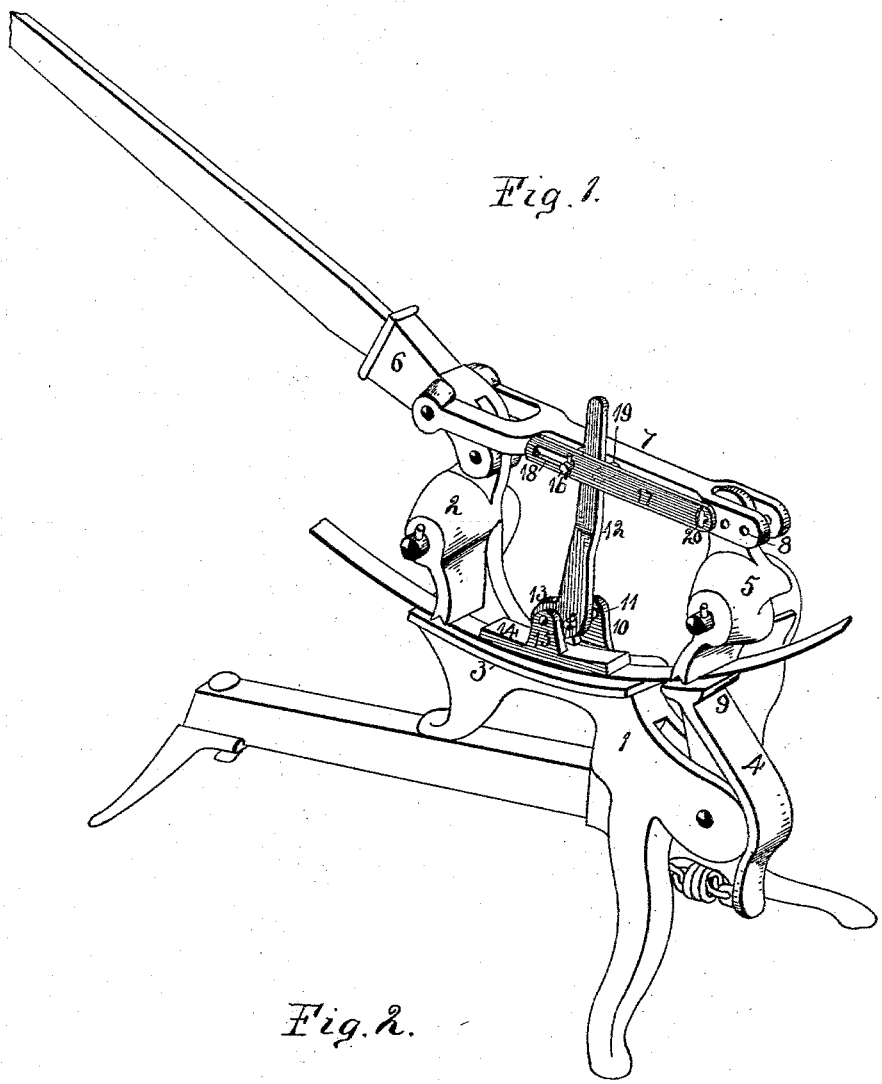
Figure 2:
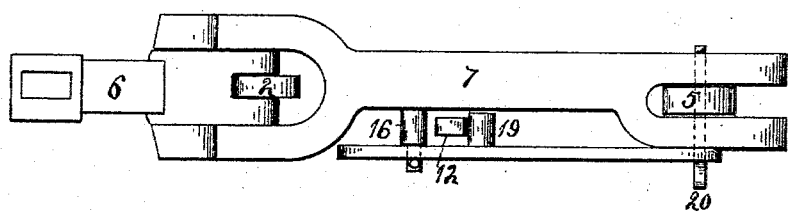

In the accompanying drawings, Figure 1, is a perspective view of a tire shrinker embodying my invention. Fig. 2, is a plan view of the top portion of the same.

The tire shrinker represented in the drawings in the main is of a well known construction and consists of a base 1, supporting a dog 2, in a pivotal manner, and having a shelf 3, upon which the tire is placed. To one end of this base is pivoted an arm 4, its upper end supporting a dog 5. To the upper end of the dog 2, is pivoted a hand lever 6, and to this hand lever is pivoted one end of a link 7. The other end of the link has a pivotal connection with the upper end of the dog 5, in an adjustable manner by means of the series of holes 8.

The tire to be shrunken is placed upon the shelf 3, and also rests upon the ledge 9, extending from the arm 4, beneath the dog 5. The hand lever 6, is then moved and its pivotal connection with the dogs 2 and 5 will cause the dogs to impinge upon the tire, holding it fast, and the further movement of the hand lever will cause the arm 4, carrying the dog 5, to move toward the dog 2, thereby shortening the distance between the dogs, consequently shortening the tire, and this operation causes the tire to buckle between the dogs, which buckling has to be hammered down, and it is to overcome this buckling that I have invented and applied my improvements which will now be explained. To the upper face of the base is secured a bracket 10, having a horizontal stud 11. Upon this stud is pivoted a bell-crank lever, the longer arm 12, extending vertically alongside of the link 7, and above the same, the shorter arm 13, extending horizontally, having a shoe 14, pivotally connected thereto through the medium of the uprising ears 15. From the face of the link 7, extends a stud 16, having a pin extending through its end in a vertical direction. A plate 17, has an elongated opening 18, in one end, its other end being provided with a perforation. A stud 19, extends horizontally from the inner face of the plate, and the longer arm of the bell-crank lever is placed between the plate and link and between the studs 16, and 19. A pin 20, is passed through the perforated end of the plate 17, and through the end of the link and upper end of the dog 5, forming a connection between these three parts. When the hand lever is depressed it will move the link in its lengthwise direction toward the handle end. This movement will cause the stud 19, to come in contact with the vertical portion of the bell-crank lever moving it, when its pivotal support will depress the horizontal portion of the bell-crank lever carrying the shoe 14, with it, until it just or not quite touches the tire, and the further movement of the hand lever will compress that portion of the tire between the dogs 2, and 5, as before stated, and the shoe 14, overlying that portion of the tire between the dogs will hold it down, preventing its buckling or kinking, and upon raising the hand lever to release the tire the stud 16, will come in contact with the opposite edge of the vertical arm of the bell crank-lever to that operated upon by the stud 19, causing the bell-crank lever to move upon its pivotal support, raising the shoe clear of the tire, allowing the replacing of a new tire, when the operation may be repeated.

The link 7, is made adjustable in its connection with the dog 5, by the series of holes 8, to suit different thicknesses of tires, and the elongated opening 18, in the plate permits of the adjustment of the plate in unison with the link, which will carry the stud 19, a greater distance from the stud 16, and consequently exert less force upon the bell-crank lever to bring the shoe in proper relation with the tire according to its thickness.

I claim as my invention—

1. In a tire shrinker the combination of a suitable frame, a support for the tire, two pivoted dogs having a link connection, a hand lever operating the dogs, a movable shoe overying that portion of the tire located between the dogs and a connection between the shoe and link by which it is operated.

2. In a tire shrinker the combination of a suitable frame, a support for the tire, two pivoted dogs having a link connection a hand lever operating the dogs, a movable shoe overlying that portion of the tire located between the dogs, a bell crank lever having a pivotal connection with the frame, one arm having a connection with the shoe and the other arm operated upon by the movement of the link connection.

3. In a tire shrinker the combination of a suitable frame, a support for the tire, two pivoted dogs having a link connection, a hand lever operating the dogs, a movable shoe overlying that portion of the tire located between the dogs, a bell crank lever having a pivotal connection with the frame, one arm having a connection with the shoe and the other arm extending vertically alongside the link connection, a stud extending from the link connection, a plate having an adjustable connection with the stud at one end, its other end having a connection with the link connection, and a stud extending from the plate operating upon the vertical arm of the bell crank.

SAMUEL T. STITES.

Witnesses:
GEO. S. BRIGGS,
A. O. BEHEL.